July 23, 1957 W. A. HERPICH ET AL 2,800,234
VEHICLE BODY WITH PACKING AND EJECTOR PLATE MEANS
Filed April 6, 1955 2 Sheets-Sheet 1
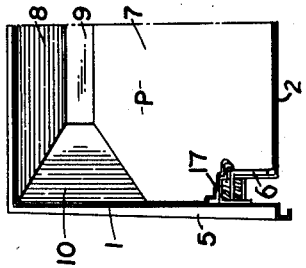
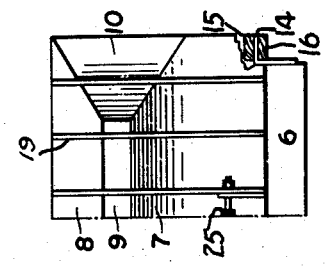
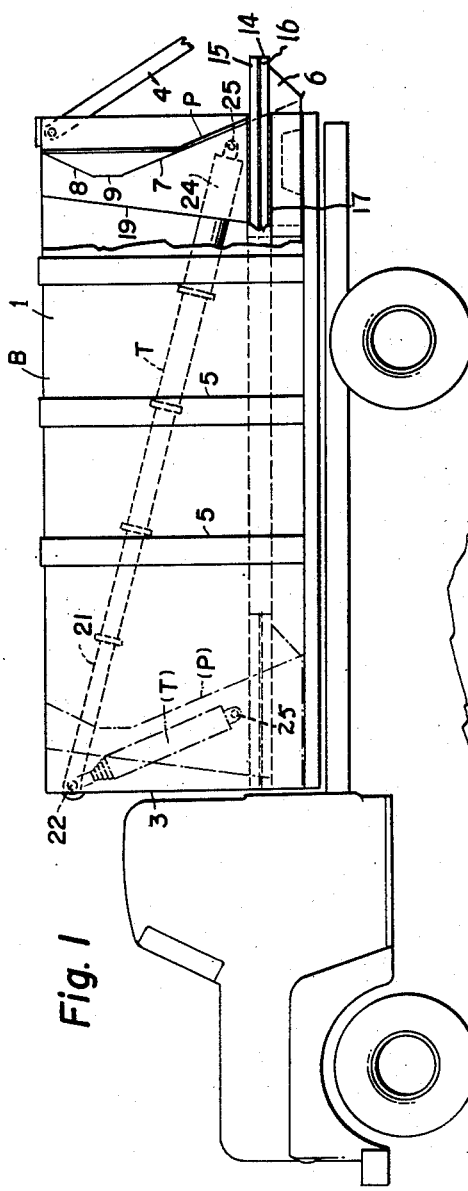
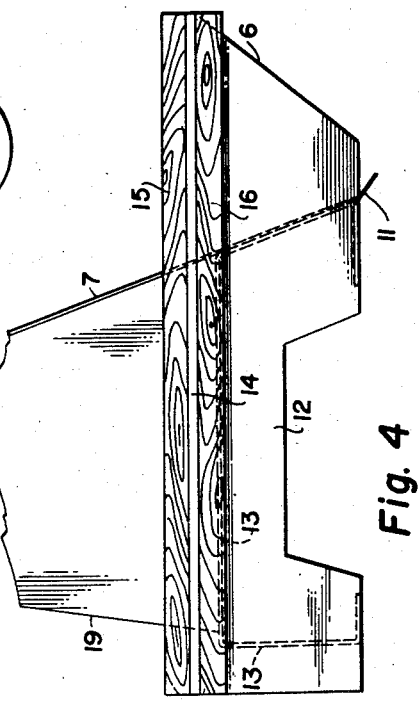
INVENTORS
WILLIAM A. HERPICH AND
BY JOHN GEORGE SAND
Oberlin + Limbach
ATTORNEYS.

July 23, 1957   W. A. HERPICH ET AL   2,800,234
VEHICLE BODY WITH PACKING AND EJECTOR PLATE MEANS
Filed April 6, 1955   2 Sheets-Sheet 2
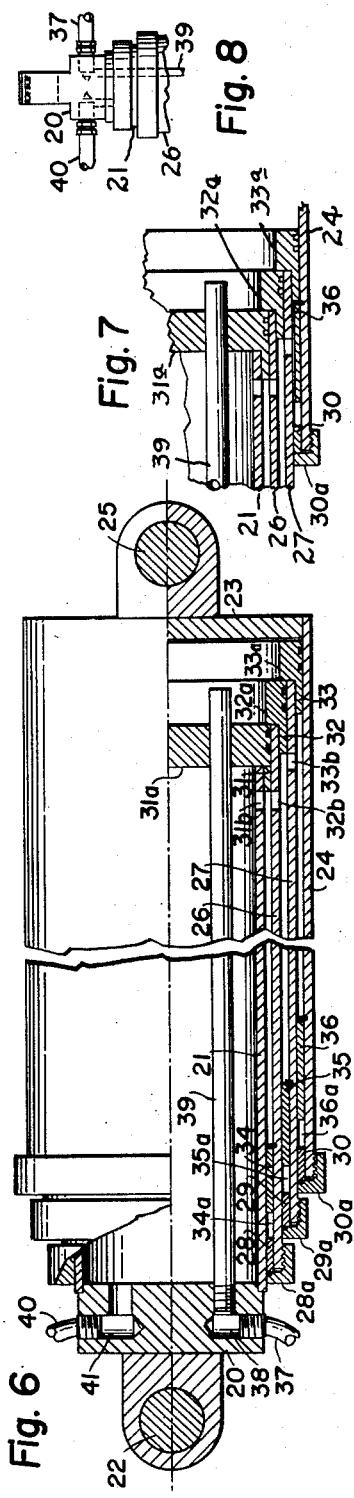
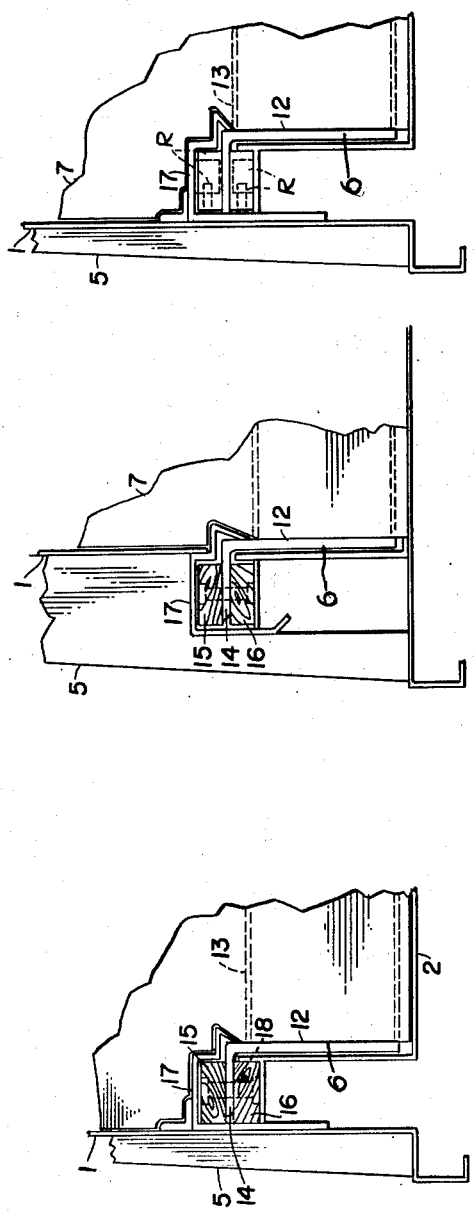
INVENTORS
WILLIAM A. HERPICH AND
BY JOHN GEORGE SAND.
Oberlin & Limbach
ATTORNEYS United States Patent Office 2,800,234
Patented July 23, 1957

2,800,234

VEHICLE BODY WITH PACKING AND EJECTOR PLATE MEANS

William A. Herpich and John George Sand, Galion, Ohio, assignors, by mesne assignments, to Hercules Galion Products, Inc., Wilmington, Del., a corporation of Delaware Application April 6, 1955, Serial No. 499,612

5 Claims. (Cl. 214—82)

The present improvements, relating as indicated to vehicle bodies, have more particular regard to the provision of improved means in a vehicle body, or for that matter in any type of body designed for the collection and transport of loose materials, whereby the latter may be either compacted together in the body and/or discharged therefrom. One large field of use for such bodies is found in rubbish-collecting trucks such as are coming into increased use in municipalities and other similar areas. However, as will appear, the present improvements are not limited to any such particular field of use.

In vehicle bodies of the type in question it has heretofore been proposed to mount a platen reciprocable longitudinally of the body for the purpose of thus compacting material collected within the latter, or for discharging such material. However the construction of a platen to serve such purpose presents a considerable problem which so far as we are aware has never been satisfactorily solved, and this is likewise true of the provision of power means for reciprocating such platen.

Accordingly, one object of the present invention is to provide a platen of such construction and so mounted within the vehicle body as to insure smooth, easy reciprocation thereof. A related object is so to construct such platen that it will effectively compact material deposited in front thereof without slippage or jamming.

A further object is to provide a power device capable of being actuated by pressure fluid, which will be extremely compact and yet efficient in its operation. A related object here is so to construct such device that the pressure exerted thereby on the platen, and through the latter on the material being compacted in the body, will be maintained substantially uniform throughout the path of travel of the platen.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 1 is a side elevation, with parts broken away to show the interior construction, of a vehicle body of which our present improvements have been incorporated;

Fig. 2 is a broken transverse section of such body showing the platen mounted therein, as viewed from the right in Fig. 1;

Fig. 3 is a view similar to Fig. 2 but showing such platen as viewed in the opposite direction;

Fig. 4 is a side elevation of the lower portion of such platen, including the base which forms a component thereof, said view being in effect an enlargement of the parts in question as shown in Fig. 1;

Fig. 5 is a transverse section of the same parts, being in effect an enlargement of the view thereof shown in Fig. 2;

Figs. 5-a and 5-b are views similar to Fig. 5, but illustrating modifications in the construction there shown;

Fig. 6 is partially a side elevation and partially a sectional view of a set of telescopic cylinders that constitutes the actuating device whereby the platen is reciprocated within the body;

Fig. 7 is a similar view of the right-hand end of said device showing the cylinders in different position; and Fig. 8 is a broken elevational view of one end of such device, as viewed from the left in Fig. 1.

As indicated by the foregoing description of the several figures of the drawings, the main components of the invention comprise a body B, a platen P and a set T of telescopic cylinders which constitutes the actuating device for reciprocating said platen longitudinally of said body. It will be noted that in Fig. 1 the platen P is shown in two positions, one in wholly dotted outline at the left or forward end of the body B and the other in full lines at the right-hand end of such body. Similarly, in said figure, the actuating device T in its position corresponding with such first position of the platen is shown in fully collapsed condition and in its position corresponding with such second position of the platen is shown in fully extended condition. Moreover, while in said Fig. 1 the body B, with the associated parts just referred to, is shown as carried by a conventional automotive vehicle or truck, its use is not limited to any particular form of transport, any more than it is limited to the handling of any particular material. In other words, while the embodiment thus selected for illustration of our invention is particularly suited for the collection of rubbish or like compressible materials of a miscellaneous character, other uses are contemplated, at least certain components may be employed in a different environment for quite different uses.

The body B, as illustrated in Figs. 1, 2 and 3, comprises essentially two side walls 1 and a bottom wall or floor 2. Desirably, although not necessarily, a wall 3 is added to close the front end of the body, and similarly a removable or displaceable end gate 4 to close the rear end thereof. It will also be understood that if desired a cover, removable in whole or in part, may also be added. Ordinarily the body will be constructed of sheet metal of suitable gauge and in order to stiffen the side walls, vertically extending angles or channels 5 will be attached at spaced intervals along the outside thereof. For reasons that will appear, the bottom wall 2, instead of spanning the entire width between the side walls 1, is made somewhat narrower in order to accommodate the particular form of guide means for the base of the platen P here shown. However, as illustrated in Fig. 5-a, such bottom wall or floor may be of full width and in any case it, equally with the side walls, presents a smooth interior surface throughout the length of the body B.

As previously indicated, the platen P is designed to be reciprocable longitudinally of the body thus provided. As best shown in Figs. 4 and 5, one principal component of the platen is a base 6, which, as will presently be described, has tongue-and-groove engagement with the side walls 1 of the body, and a plate that is mounted on and extends in a general vertical direction above said base. Preferably, as illustrated in Figs. 1, 2 and 3, such plate, which, as in the case of the body walls, will ordinarily consist of sheet metal of suitable gauge, comprises a main body 7 that inclines slightly rearwardly, an upper portion 8 that inclines forwardly, an intermediate substantially vertical portion 9, and lateral portions 10 that incline inwardly towards such intermediate portion. In addition, the lower edge 11 of the plate likewise inclines forwardly from the body thereof and is sufficiently flexible to maintain close fitting contact at all times with the bottom wall of the body B, irrespective of slight inequalities in such surface. It will be understood that in describing the inclination of such component parts of the plate as "forwardly" and "rearwardly," the face of the plate directed towards the rear end of the truck body is to be taken as its front or forward face, which it actually is in the operation of the platen.

Turning now to the construction of the base 6, which carries the plate 7, i. e. the platen proper, such base (see Figs. 4 and 5) will be seen to comprise two side members 12 connected so as to be held in rigidly spaced relation by a plate 13 that is bent downwardly at its respective rear and front ends and then inwardly so as to provide an open box-like member. Each side member 12 is formed adjacent the upper edge thereof with an outwardly directed flange 14 that extends the entire width of said side member. Secured in turn to the upwardly and downwardly directed faces of said flange are shoes 15, 16, which are designed to have sliding engagement with a complementary, enclosing metal housing 17 that is attached to and extends longitudinally of the adjacent side wall 1 of the body B.

The construction is such as in effect to provide tongue-and-groove engagement between the base 6 and such side wall, and by making the shoes 15 and 16 of suitable material, e. g. wood, impregnated if desired with graphite or equivalent lubricant, the base may be reciprocated longitudinally of the body with a minimum amount of friction. At the same time, by reason of the extent of such tongue-and-groove engagement between such shoes and housing 17, it is enabled to resist twisting or tilting strains imposed thereon incidentally to operation of platen P.

The component parts of the base, as described, will of course be made of metal, such parts being welded or otherwise secured together in proper assembled condition, and shoes 15 and 16 may be secured to flange 14 in any suitable manner as by bolts or rivets 18. Also, if desired, the grooves formed by the housing 17 may be incorporated in the corresponding side walls of body B, as illustrated in Fig. 5-a, and in such case the floor of the body B, as well as the lower portion of the platen P may be of full width. Also, other anti-friction means, such as the rollers R illustrated in Fig. 5-b may be substituted for the shoes 15, 16.

The forward downwardly bent portion of plate 13 is inclined at the same angle as the body 7 of the plate that forms the platen proper, and in addition to being attached thereto said plate is further supported by a series of plate-like braces 19 that are transversely spaced of and attached at their lower ends to said base. As shown, such braces will desirably have front faces that conform with the rear face of the plate and rise to the same height as said plate (see Fig. 1).

It will thus be seen that the platen P, while compact, is of extremely rigid construction and so able to meet the strains to which it is subjected in operation. In particular, the construction of the base, whereon the plate 7 that provides the material-engaging face of the platen is mounted, and the manner in which such base, and thus the platen, is secured to the side walls of the body are such as to insure smooth reciprocation of the platen under all conditions. It will further be noted that the housing 17, within which the platen shoes are guided, is so formed as effectively to prevent entry of material therein which would interfere with the free movement of the base.

As previously indicated, for the purpose of reciprocating the platen we preferably employ a set of fluid actuated telescopic cylinders T, the detailed construction of which is best shown in Fig. 6. Actuators of this general type are well known, but for the purpose in hand we have incorporated several important improvements. First of all, the set of telescopic cylinders is arranged so that one thereof, preferably the closed end 20 of the inner, smaller cylinder 21, may be connected as by pivot 22 to a point on the body B located substantially as high as the top of platen P; while the closed end 23 of the outer, larger cylinder 24 is connected by a similar pivot 25 with the base of said platen, preferably midway between the sides of said base. In addition to such inner and outer cylinders, two intermediate cylinders 26 and 27 are employed in the illustrated construction, but the number of such intermediate cylinders may of course be varied depending upon the desired overall length of the set when collapsed and the maximum length of movement which it is desired to obtain from the actuator.

As is well understood in the construction of such telescopic cylinder type of actuator, the successive cylinders are spaced from each other as by bearings 28, 29 and 30 at their left-hand ends as shown in Fig. 6 and by rings 31, 32 and 33 at their right-hand ends, so as to provide annular spaces between such cylinders. The aforesaid bearings are held in place by flanged collars 28a, 29a and 30a, respectively, and of the aforesaid rings 31, 32 and 33, the first is carried by a plate 31a that serves as a closure for the adjacent end of the inner cylinder 21, while the second is carried by a collar 32a that is adapted to abut against said plate, and the third by a collar 33a that is adapted to abut against said collar 32a. In addition, the two intermediate and outer cylinders are provided with inwardly directed stop rings 34, 35 and 36, respectively adjacent their left-hand ends, Fig. 6, but spaced from the corresponding bearings 28, 29 and 30 to leave encircling spaces 34a, 35a and 36a. Adjacent the rings 31, 32 and 33, at the right-hand ends of the inner and two intermediate cylinders, the latter are formed with ports 31b, 32b and 33b.

For the purpose of supplying pressure fluid to the outer, larger cylinder, a connection 37 is provided with the closed end 20 of the inner, smaller cylinder, such connection leading through a port 38 to a duct 39 that is located within said inner cylinder and extends to the further end thereof, where it is sealed off from the interior of said inner cylinder by previously mentioned plate 31a. In addition to such connection 37, a separate connection 40 is provided with said inner cylinder end 20, such connection leading directly through port 41 to the interior of said cylinder.

It will be understood that normally the several telescoping cylinders just described will be filled with oil or other pressure fluid employed in their operation. In order then to extend the set of cylinders, additional fluid under pressure is supplied through connection 37, port 38 and duct 39 into the space between the end 23 of the outer, larger cylinder and the closure plate 31a at the adjacent end of the inner, smaller cylinder. As pressure is built up, such end 23 of said outer cylinder is forced away from said closure 33a of the larger, moving cylinder, pushes against collar 32a of next size cylinder and this collar 32a pushes against collar 31a of next size cylinder and the entire assembly moves until ring 33 strikes stop ring 36. Then collar 32a moves away from collar 33a, and shoves against collar 31a, moving the assembly until ring 32 strikes stop ring 35. Finally, collar 31a moves away from collar 32a until ring 31 strikes retainer ring 34.

Conversely, when it is desired to collapse the cylinders, fluid under pressure is supplied through inlet 40 and port 41 into the inside of the smaller cylinder, and thence through port 31b. The pressure thereupon drives stop ring 31 away from retainer ring 34 until closure plate 31a strikes against collar 32a. At this point pressure fluid goes through ports 31b and 32b and applies pressure forcing ring 32 away from retainer ring 35 until collar 32a strikes against collar 33a. The pressure fluid then goes through ports 31b, 32b and 33b until the cylinders are completely collapsed.

It will accordingly be seen that by means of our improved arrangement of fluid actuated cylinders we provide for positive reciprocation in both directions of the movable member, exemplified by the platen P. Furthermore, by the angular disposition of our improved fluid actuated telescopic cylinders, referring specifically to the angle illustrated in Fig. 1, initially approximately 60% of the pressure applied to the platen is vertical and 40% horizontal. However, as the telescopic cylinders are extended to their full length, this relationship changes so that approximately 5% of the pressure is vertical and 95% horizontal. Simultaneously with the change of pressure, due to such change in the angular disposition of the set of telescopic cylinder, the pressure, as has been explained, is successively applied to cylinders of successively decreasing diameter. As a result it will be seen that a more nearly uniform application of pressure on the platen throughout its path of travel is obtained. Finally, by mounting such set of cylinders in the manner described, it is possible to bring the fixed supply line for the pressure fluid used to actuate the cylinders to a point closely adjacent the end with which the connections required to be made, both for advancing and retracting said cylinders. Accordingly, only a short length of flexible hose is required to make the required connections.

A vehicle body constructed as hereinbefore described has been found in actual test to present a number of advantages over any currently in use for collecting municipal rubbish. In using the body for this purpose, an end gate will be employed to close the rear end of the body B and the body then more or less filled while the platen P is in fully retracted position. Thereupon the platen will be advanced to press the material against such end gate to form a compact mass thereof. Following this the platen will again be withdrawn to its forward position, the empty space in the truck body again filled, and the operation repeated until such body is loaded to its maximum capacity. When it is desired to empty the body, all that is necessary is to open the end gate, advance the platen and the accumulated mass of material will be discharged from the rear end of the body.

The construction of the body, and particularly of the platen and actuator therefor, of course lends itself to other uses than the one just described, including merely such unloading operation. In other words, with the platen fully retracted, the body may be loaded with any material, not necessarily compressible, and such material then discharged at the desired place.

In any case, more usable space for loading is provided, since the platen, despite its sturdiness, is highly compact, and the arrangement of the actuator therefor permits such platen to be brought directly up to the front end of the body. At the same time the construction of base for the platen insures smooth reciprocation of the latter, even where the load is unevenly distributed in the body.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. In a vehicle of the character described, the combination of an elongated body having bottom and side walls, a platen movable longitudinally of said body in sliding contact with such bottom and side walls, said platen comprising a base of substantial longitudinal extent having tongue-and-groove engagement with such side walls, a plate mounted on and extending in a general vertical direction above said base, and power means between the forward end of said body and said platen for reciprocating the latter, said means comprising a set of telescopic cylinders having the outer, larger cylinder pivotally connected at its closed end to said base and the inner, smaller cylinder pivotally connected at its closed end to a point on said body substantially as high as said platen, and connections with such closed end of such smaller cylinder for supplying pressure fluid thereto.

2. In a vehicle of the character described, the combination of an elongated body having bottom and side walls, a platen movable longitudinally of said body in sliding contact with such bottom and side walls, said platen comprising a base of substantial longitudinal extent having tongue-and-groove engagement with such side walls, a plate mounted on and extending in a general vertical direction above said base, and power means between the forward end of said body and said platen for reciprocating the latter, said means comprising a set of telescopic cylinders having the outer, larger cylinder pivotally connected at its closed end to said base and the inner, smaller cylinder pivotally connected at its closed end to a point on said body substantially as high as said platen, and separate connections with such closed end of such inner cylinder for supplying pressure fluid thereto and to such other cylinder, respectively.

3. In a vehicle of the character described, the combination of an elongated body having bottom and side walls, a platen movable longitudinally of said body in sliding contact with such bottom and side walls, said platen comprising a base of substantial longitudinal extent having tongue-and-groove engagement with such side walls, a plate mounted on and extending in a general vertical direction above said base, and power means between the forward end of said body and said platen for reciprocating the latter, said means comprising a set of telescopic cylinders having the outer, larger cylinder pivotally connected at its closed end to said base and the inner, smaller cylinder pivotally connected at its closed end to a point on said body substantially as high as said platen, and separate connections with said closed end of such inner cylinder for supplying pressure fluid thereto and to such other cylinder, respectively, such connections for such outer cylinder including a duct extending from the closed end of such inner cylinder to a point adjacent the closed end of such outer cylinder, the outer end of such duct being sealed off from the interior of such inner cylinder.

4. In a vehicle of the character described: an elongated material collection body for rubbish and the like having end, bottom, and side walls, one of the end walls being movable at least in part to provide an opening for discharge therethrough of the material collected in the body; a platen arranged transversely in said body and being reciprocable longitudinally therein in a substantially upright position in contact with the bottom and side walls, said platen and said one end wall of the body defining therebetween the space in which the material collected in the body is received; cooperable longitudinally extending guide members on the platen and the body and at opposite sides of the platen to maintain the same in its substantially upright position throughout reciprocation thereof; and power means totally within the confines of the body for reciprocating said platen positively in both directions, whereby material in such chamber can be compressed by advancing the platen towards said one end wall of the body and ejected by the platen when said wall is adjusted to provide the discharge opening, said power means comprising a fluid-pressure operated telescopic assembly having its ends connected respectively to the other end wall of the body and the platen, both such end connections of the member being pivotal, with one displaced relative to the other in the plane of the assembly by an amount approximately equal to the height of the platen, whereby the assembly is diagonally disposed with reference to the longitudinal axis of the body in the space between the platen and such other end wall of the body.

5. The combination set forth in claim 4, characterized further in that said power means is formed by a set of telescoping cylinders, with the smaller cylinder connected to said other end wall of the body and being provided with connections for the supply of the fluid under pressure to the same.

References Cited in the file of this patent

UNITED STATES PATENTS

| | | |
|---|---|---|
| 1,769,939 | Berasi | July 8, 1930 |
| 1,908,899 | Kayel | May 16, 1933 |
| 2,284,661 | Joy | June 2, 1942 |
| 2,408,284 | Anthony | Sept. 24, 1946 |
| 2,705,083 | Soderstrom | Mar. 29, 1955 |

FOREIGN PATENTS

| | | |
|---|---|---|
| 474,968 | Germany | Apr. 17, 1929 |